US009501816B2

(12) United States Patent
Li et al.

(10) Patent No.: US 9,501,816 B2
(45) Date of Patent: Nov. 22, 2016

(54) REDUCING THE DYNAMIC RANGE OF IMAGE DATA (71) Applicant: NATIONAL ICT AUSTRALIA LIMITIED, Everleigh (AU)

(72) Inventors: Yi Li, Eveleigh (AU); Nick Barnes, Eveleigh (AU)

(73) Assignee: NATIONAL ICT AUSTRALIA LIMITED, Eveleigh, NSW (AU)

(*) Notice: Subject to any disclaimer, the term of this patent is extended or adjusted under 35 U.S.C. 154(b) by 0 days.

(21) Appl. No.: 14/399,493

(22) PCT Filed: May 6, 2013

(86) PCT No.: PCT/AU2013/000465
§ 371 (c)(1),
(2) Date: Nov. 6, 2014

(87) PCT Pub. No.: WO2013/166544
PCT Pub. Date: Nov. 14, 2013

(65) Prior Publication Data
US 2015/0146997 A1  May 28, 2015

Related U.S. Application Data (60) Provisional application No. 61/645,392, filed on May 10, 2012.

(30) Foreign Application Priority Data

May 10, 2012  (AU) ................................ 2012901919

(51) Int. Cl.
G06T 5/00  (2006.01)
(52) U.S. Cl.
CPC ..... G06T 5/007 (2013.01); G06T 2207/10012 (2013.01); G06T 2207/10016 (2013.01);
(Continued)

(58) Field of Classification Search
CPC combination set(s) only.
See application file for complete search history.

(56) References Cited

U.S. PATENT DOCUMENTS 7,983,502 B2    7/2011  Cohen et al.
2002/0154323 A1  10/2002  Sobol et al.
(Continued)

FOREIGN PATENT DOCUMENTS

WO    WO 2011/002505    1/2011

OTHER PUBLICATIONS

Australian Patent Office, International Search Report and Written Opinion of the International Searching Authority, PCT/AU2013/000465, May 31, 2013, 10 pages.
(Continued)

Primary Examiner — Duy M Dang (57) ABSTRACT

This disclosure concerns the determination of low dynamic range image data from high dynamic range image data. A processor determines the low dynamic range image data by optimizing a degree to which the low dynamic range image data satisfies a local contrast constraint and a global consistency constraint. The local contrast constraint is based on a local contrast in a perception space while the global consistency constraint is based on a relationship between points in the high dynamic range image data. The determined low dynamic range image data preserves the local contrast from the high dynamic range image data while also preserving the relationship between points in the high dynamic range image data to a high degree. As a result, the method prevents contrast distortion, halos and artifacts and ordering of level lines (isocontours) is preserved.

17 Claims, 3 Drawing Sheets (52) U.S. Cl.
CPC ............... *G06T 2207/10024* (2013.01); *G06T 2207/10028* (2013.01); *G06T 2207/20012* (2013.01); *G06T 2207/20208* (2013.01)

(56) References Cited

U.S. PATENT DOCUMENTS

2008/0019608 A1 1/2008 Zuro
2011/0292246 A1 12/2011 Brunner

OTHER PUBLICATIONS

Anonymous ECCV submission, Paper ID 412, "Just Noticeable Difference Revisited—HDR Tone Mapping from an Optimization Perspective" 14 pages, 2012.

P. Lieby et al., "Substituting depth for intensity and real-time phosphine rendering: Visual navigation under low vision conditions", 4 pages, IEEE 2011.

Chen et al, "Simulating prosthetic vision: I. Visual models of phosphenes" 2009, published by Elsevier Ltd., Vision Research 49, pp. 1493-1506.

Zhu et al, "L-BFGS-B—Fortran subroutines for large-scale bound-constrained optimization", Dec. 31, 1994, Northwestern University, Department of Electrical Engineering and Computer Science, 17 pages.

Sira Ferradans et al., "An analysis of visual adaptation and contrast perception for Tone Mapping" IEEE Transactions on Pattern Analysis and Machine Intelligence vol. pp., No. 99 2011, 12 pages.

Mantiuk et al, "A Perceptual Framework for Contrast Processing of High Dynamic Range", ACM Transaction on Applied Perception, vol. 3, No. 3, Jul. 2006, pp. 286-308.

Y. Li, C. McCarthy, and N. Barnes, "On Just Noticeable Difference for Bionic Eye", EMBC, 2012, 4 pages.

Dowling et al, "Simulated artificial human vision: The effects of spatial resolution and frame rate on mobility", Proceedings Active Media Technology, 2006, 7 pages.

Chen et al, "Visual acuity measurement of prosthetic vision: A virtual-reality simulation study", submitted to the Journal of Neural Engineering to the Special Issue on the Eye & the Chip, Dec. 20, 2004, 37 pages.

Stevens S. S., "On the psychophysical law" Harvard University, vol. 64, No. 3, May 1957 pp. 153-181.

Vurro et al., "Simulation and Assessment for Bioinspired Visual Processing System for Epi-retinal Prostheses", Proceedings of the 28th IEEE, EMBS Annual International Conference, New York City, Aug. 30-Sep. 3, 2006, pp. 3278-3281.

Magnus Hestenes, "Conjugate Direction Methods in Optimization", Chapter IV, Conjugate Gradient Algorithms, 1980, pp. 231-247.

REDUCING THE DYNAMIC RANGE OF IMAGE DATA

TECHNICAL FIELD

This disclosure concerns the determination of low dynamic range image data from high dynamic range image data. In particular the invention concerns, but is not limited to, methods, systems and software for determining of low dynamic range image data from high dynamic range image data.

BACKGROUND ART

The human eye can process an astonishing dynamic range from snow in bright sunlight, to the light of a glow worm in a dark cave. Photographers aim to capture the widest possible range of brightness values of objects in a scene. Previously, this is achieved by manually dodging and burning dark and light areas of the photograph respectively. With the advent of digital photography the problem of displaying high dynamic range image data on low dynamic range media, such as paper or monitors, has emerged.

Figure 1A:
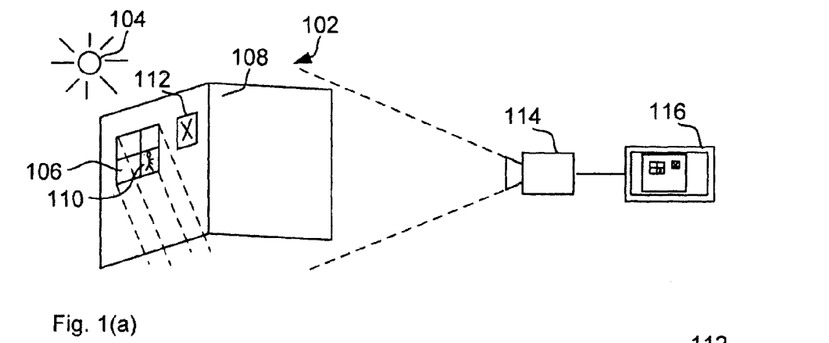
FIG. 1(a) illustrates a scene.

FIG. 1(a) illustrates a scene 102 comprising the sun 104 shining through a window 106 into a room 108. The window 106 is a stained glass window with a picture 110 on it. An object 112 is located on a wall next to the window such that the object is not directly illuminated by the sun 104. As a result, there is a great difference in brightness between the picture 110 in the window 106 and the object 112. A high dynamic range camera 114 captures an image of the scene 102 as a digital high dynamic range photograph. The photograph is then displayed on low dynamic range display 116.

Figure 2:
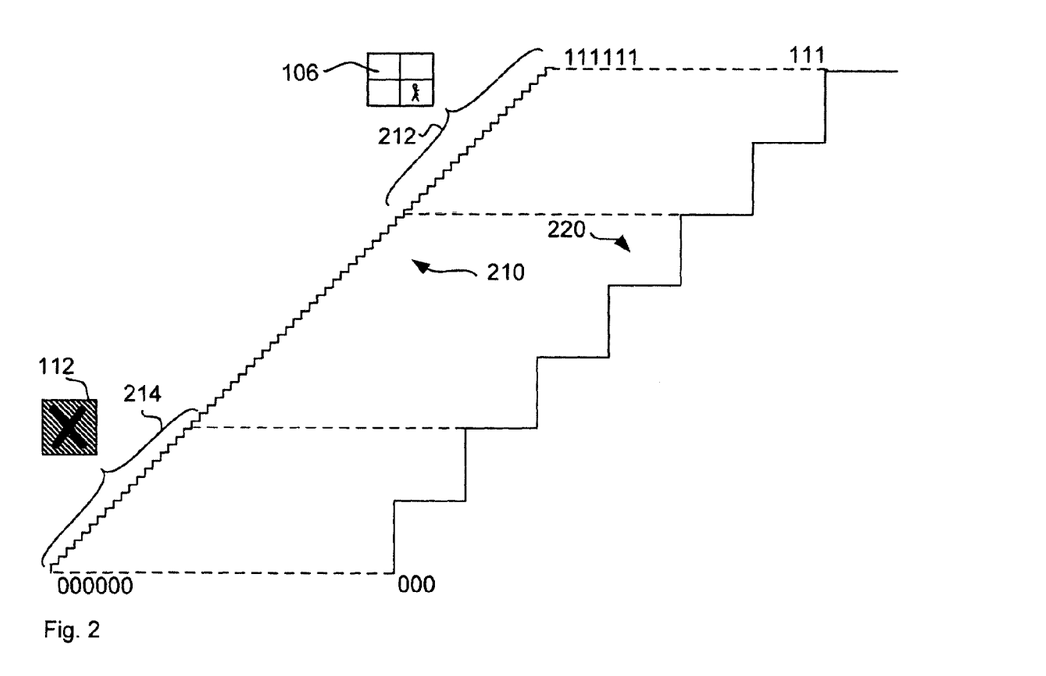
FIG. 2 illustrates a low dynamic range and a high dynamic range.

FIG. 2 illustrates the high dynamic range 210 of camera 114 and the low dynamic range 120 of display 116. The image values, such as pixel intensities, of the bright window 106 span an upper part 212 of the high dynamic range 210 while the image values of the dark object 112 span a lower part 214 of the high dynamic range 210.

In order to display the high dynamic range image from camera 114 on the low dynamic range display 116, the image values of the high dynamic range 210 are mapped onto the low dynamic range 220, which is commonly referred to as tone mapping.

In cases where the bright window 106 is the most important subject of the image, the upper part 212 of the high dynamic range 210 is stretched to span the entire low dynamic range 220. Image values that are below the lower end of the upper part 212 are mapped to black. The result of such a tone mapping is illustrated in FIG. 1(b) which shows that in the dynamic range the window 106 is clearly visible, but the dark object is not distinguishable from the black wall.

In other cases where the dark object 112 is the most important subject of the image, the lower part 214 of the high dynamic range 210 is stretched to span the entire low dynamic range 220. Image values that are above the upper end of the lower part 214 are mapped to white. The result of such a tone mapping is illustrated in FIG. 1(c) where the object 112 is clearly visible, but the picture is not distinguishable from the white window 106.

Figure 1B:
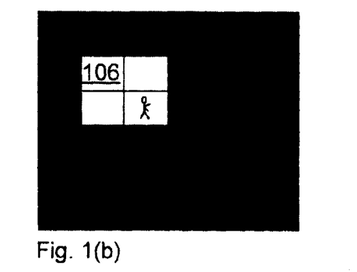
FIG. 1(b) illustrates a low dynamic range output image where high-lights have been mapped to the low dynamic range.
Figure 1C:
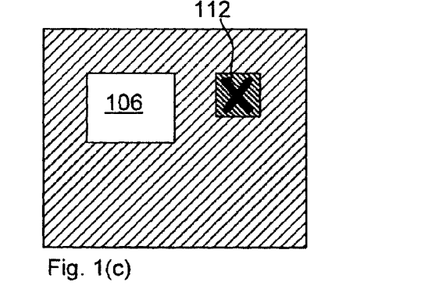
FIG. 1(c) illustrates a low dynamic range output image where low-lights have been mapped to the low dynamic range.

Neither of the results of FIG. 1(b) and FIG. 1(c) are desirable if both the picture 110 on window 106 as well as the object 112 are to be visualised. A more sophisticated method is to stretch the upper part 212 and the lower part 214 by a different factor and thereby utilise the low dynamic range optimally. This would result in a piecewise linear mapping of the high dynamic range image data 210 to the low dynamic range 220. This approach may be further extended to non-linear mapping. However, with any stretching of one part, another part is inevitably compressed Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DISCLOSURE OF INVENTION

In a first aspect there is provided a computer implemented method for determining low dynamic range image data from high dynamic range image data, the method comprising:

receiving or accessing the high dynamic range image data; and determining the low dynamic range image data based on the high dynamic range image data by optimising a degree to which the low dynamic range image data satisfies a local contrast constraint and a global consistency constraint, wherein the local contrast constraint is based on a local contrast in a perception space;

the global consistency constraint is based on a relationship between points in the high dynamic range image data.

It is an advantage that the method considers local contrast is a perception space and global consistency. As a result, the determined low dynamic range image data preserves the local contrast from the high dynamic range image data while also preserving the relationship between points in the high dynamic range image data to a high degree. As a further result, the method prevents contrast distortion, halos and artifacts and ordering of level lines (isocontours) of the high dynamic range image data is preserved.

Optimising the degree to which the low dynamic range image data satisfies the local contrast constraint and the global consistency constraint may comprise optimising a linear system bounded by the global consistency constraint.

It is an advantage that the method comprises the optimisation of a linear system. As a result, effective linear solvers can be applied which are suitable for a large number of parameters.

The degree to which the low dynamic range image data satisfies a local contrast constraint may be based on an error function that represents a distance of a candidate solution from the local contrast constraint in a solution space.

It is an advantage that the degree to which the low dynamic range image data satisfies a local contrast constraint is based on an error function. As a result, the degree to which the low dynamic range image data satisfies a local contrast constraint is quantified and a numerical optimisation method can be used.

The perception space may be based on a just noticeable difference.

It is an advantage that the perception space is based on a just noticeable difference. As a result, the method aims to preserve a local contrast that is just noticeable in the low dynamic range image data.

The perception space may be based on a transformation defined by $p=k \ln(I)+C$ or $$p = \frac{1}{1+\exp(-\mathcal{I})} + C$$

from an intensity value I in an intensity space into a perception value p in the perception space, where C is an arbitrary constant that varies in the image data and k is a scaling factor.

It is an advantage that the perception space is based on the given transformation. As a result, the method can use the transformation to optimise the degree to which the low dynamic range image data satisfies the local contrast constraint in the perception space.

The local contrast in the perception space may be based on perception values of image points of a patch comprised of a sub-set of points of the high dynamic range image.

The points of a patch may be neighboring points of the high dynamic range image.

It is an advantage that the method is patch based. As a result, the local contrast can be defined between points within the same patch.

The local contrast of one point of the patch may be based on a difference between the perception value of that point and an average perception value of the other points of the patch.

It is an advantage that the contrast is based on a difference between the value of a point and an average of the patch. This difference and the average can be formulated as a linear contrast filter that is computationally inexpensive and can be used as part of a linear system.

The degree to which the low dynamic range satisfies the global consistency constraint may be based on the degree to which an ordering of points of the high dynamic range image data by image value is preserved in the low dynamic range image data.

It is an advantage that the ordering of points is preserved. The ordering is an efficient way of representing the relationship between points in the high dynamic range image data. As a result, the optimisation is efficient.

The computer implemented method may further comprise the step of determining a difference operator that defines a difference between a first point and a second point, the second point being the closest in intensity to the first point, wherein the degree to which the ordering of points of either the high dynamic range image data is preserved is based on the difference operator.

It is an advantage that the degree to which the ordering is preserved and therefore the degree to which the global consistency constraint is satisfied is based on a difference operator. The difference operator can be formulated as a linear filter and as a result, can be used as part of a linear system.

Optimising the degree to which the low dynamic range image data satisfies the local contrast constraint and the global consistency constraint may be based on a predetermined trade-off parameter that prioritizes one of the local contrast constraint and the global consistency constraint.

It is an advantage that the method can be adjusted for different needs such that local contrast can be given priority over global consistency or vice versa. As a result, the method is flexible to adapt to different scenarios.

Optimising the degree to which the low dynamic range image data satisfies the local contrast constraint and the global consistency constraint may comprise simultaneously optimising the degree to which the low dynamic range image data satisfies the local contrast constraint and the global consistency constraint.

It is an advantage that the method optimises the degree to which both constraints are satisfied simultaneously. As a result, the method is not a two step process where the result of the first step, such a high degree of satisfying the global consistency constraint, is negatively affected by the second step of optimising the degree to which the local contrast constraint is satisfied.

Optimising the linear system may be based on One or more of:
  bounded Broyden-Fletcher-Goldfarb-Shanno method, and
  non-negative conjugate gradient method.

The method may comprise the steps of:
  receiving the high spatial resolution, high dynamic range image data;
  determining a low spatial resolution, high dynamic range image data based on the high spatial resolution, high dynamic range image data;
  performing the steps of the computer implemented method for determining low dynamic range image data from high dynamic range image data to determine a low spatial resolution, low dynamic range image data from the low spatial resolution, high dynamic range image data;
  determining a sensitivity threshold for each of multiple patches based on the determined low spatial resolution, low dynamic range image data; and
  determining for each of the multiple patches the high spatial resolution, low dynamic range image data based on the high spatial resolution, high dynamic range image data and the sensitivity threshold of that patch.

It is an advantage that the computationally intensive parts of the method are performed on low resolution image data. As a result, the overall computation time is reduced by introducing a small error. It is a further advantage that it is possible to trade of computation time against accuracy by adjusting the spatial resolution of the low spatial resolution image data.

The computer implemented method may further comprise the step of displaying the low dynamic range image data on a vision enhancement apparatus.

It is an advantage that the low dynamic range image data is displayed on a vision enhancement apparatus. As a result, a vision impaired user can view the low dynamic range image data and benefit from the optimised degree to which the low dynamic range image data satisfies the local contrast and global consistency.

The high dynamic range image data may be a depth map of a scene.

It is an advantage that the high dynamic range image data is a depth map of a scene. As a result, the low dynamic range image data is also a depth map of a scene where the individual depths of objects is visible and the relative depths between objects is preserved.

The point may be a pixel.

In a second aspect there is provided software, that when installed on a computer causes the computer to perform the method for determining low dynamic range image data from high dynamic range image data.

In a third aspect there is provided a computer system for determining low dynamic range image data from high dynamic range image data, the system comprising:
- an input port to receive or access the high dynamic range image data; and
- a processor to determine the low dynamic range image data based on the high dynamic range image data by optimising a degree to which the low dynamic range image data satisfies a local contrast constraint and a global consistency constraint, wherein
  - the local contrast constraint is based on a local contrast in a perception space;
  - the global consistency constraint is based on a relationship between points in the high dynamic range image data.

In a fourth aspect there is provided a vision enhancement apparatus for enhancing vision for a vision impaired user of high dynamic range image data, the apparatus comprising:
- an input port to receive or access the high dynamic range image data;
- a processor to determine the low dynamic range image data based on the high dynamic range image data by optimising a degree to which the low dynamic range image data satisfies a local contrast constraint and a global consistency constraint, wherein
  - the local contrast constraint is based on a local contrast in a perception space;
  - the global consistency constraint is based on a relationship between points in the high dynamic range image data; and
- a display to display or to cause the display of the low dynamic range image data to the vision impaired user.

Optional features of the first aspect, when appropriate, are also optional features of the other aspects of the invention.

BRIEF DESCRIPTION OF DRAWINGS

Examples will be described with reference to the following figures in which.

BEST MODE FOR CARRYING OUT THE INVENTION

Figure 3:
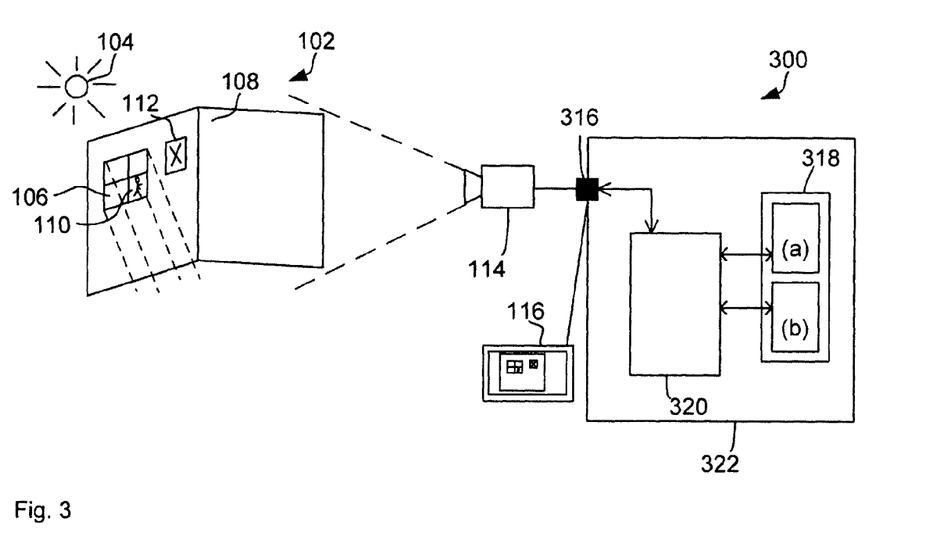
FIG. 3 illustrates a computer system for determining low dynamic range image data from high dynamic range image data.

FIG. 3 illustrates a computer system 300 for determining low dynamic range image data from high dynamic range image data. The computer system receives high dynamic range image data from high dynamic range camera 114 that captures a high dynamic range image of the scene 102 of FIG. 1. The computer system 300 comprises a program memory 318(a), a data memory 318(b) and a processor 320. The computer system 300 is connected to camera 114 and display 116 via port 316. The computer 300 can include application specific software to perform the method.

In one example the computer system 300 is integrated into a handheld device such as a consumer camera or mobile communication device, such as a smart phone or tablet computer. In this case, software stored in an application may execute the method. In a different example, the computer system 300 is part of a vision enhancement apparatus for enhancing vision for a vision impaired user. In that example, the low dynamic range display 116 is a retinal prosthesis that stimulates the retina. In yet a further example the method may be executed by software offered to the computer by a website.

In one example, the camera 114 is a current consumer SLR camera with a dynamic range of 14 bit and the output image is in jpg format that is limited to 8 bit. In another example the camera 114 captures multiple images, such as 8 images of 14 bit, over a range of exposure values. This is commonly referred to auto exposure bracketing. The resulting images are combined resulting in a final image that has a higher dynamic range than the camera 114.

Figure 5:
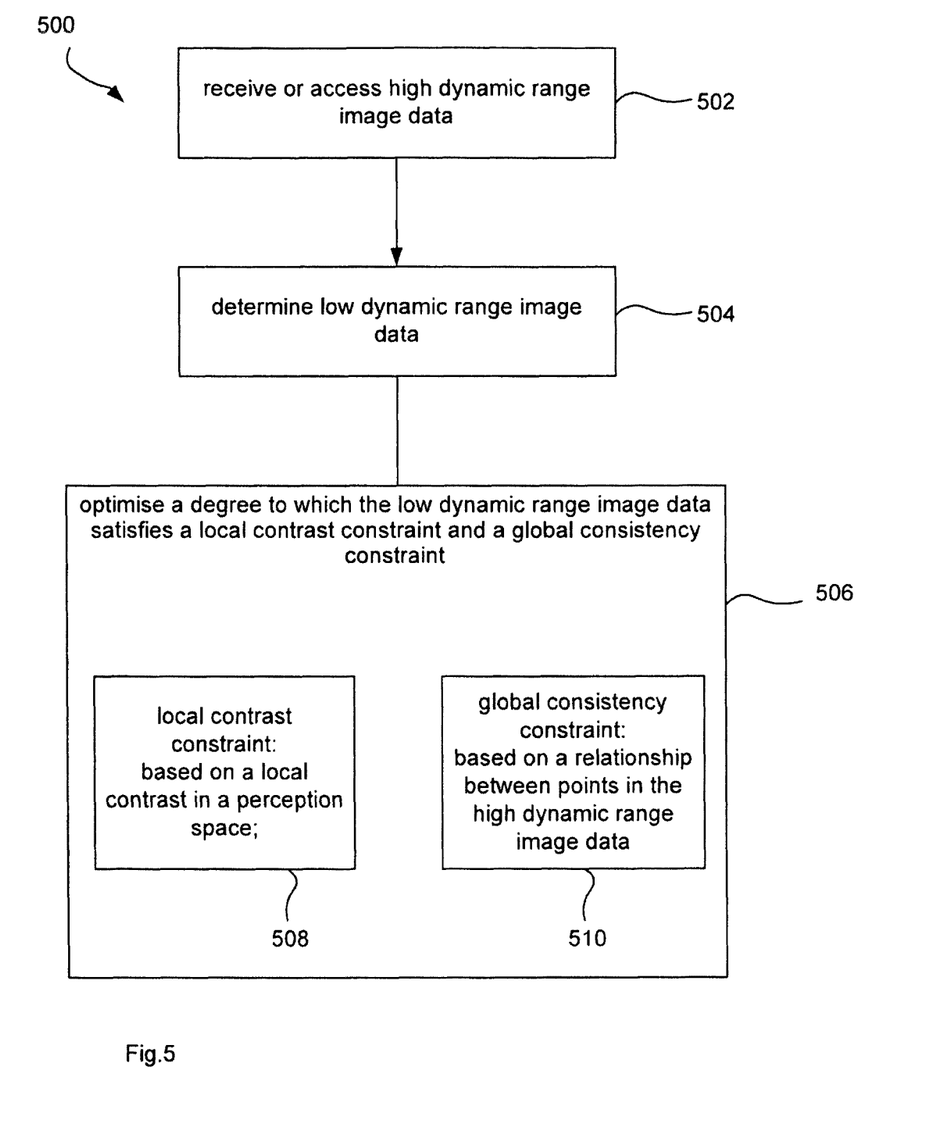
FIG. 5 illustrates a method for determining low dynamic range image data from high dynamic range image data.

The computer system 300 receives high dynamic range images from the camera 114, which are stored in local data memory 318(b) by processor 320. The processor 320 uses software stored in program memory 318(a) to perform the method shown in. FIG. 5. In this sense the processor 320 performs the method of determining low dynamic range image data from high dynamic range image data. The processor receives or accesses the high dynamic range image data and determines low dynamic range image data based on the high dynamic range image data. The processor achieves this by optimising a degree to which the low dynamic range image data satisfies two constraints—a local contrast constraint and a global consistency constraint. The local contrast constraint is based on a local contrast in a perception space while the global consistency constraint is based on a relationship between points in the high dynamic range image data.

In one example, the camera captures a sequence of images such as frames of video data and the processor performs the method for each image and thereby determines output video data.

Figure 4A:
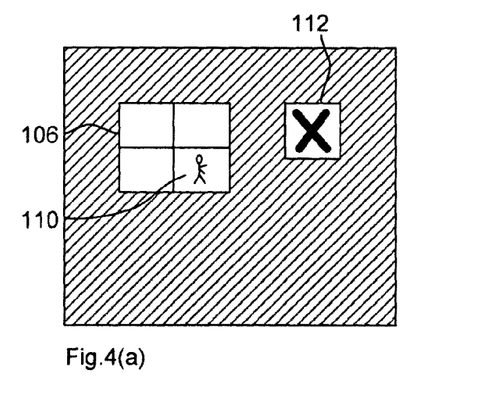
FIG. 4(a) illustrates a low dynamic range output image where a global consistency constrained is satisfied to a small degree.
Figure 4B:
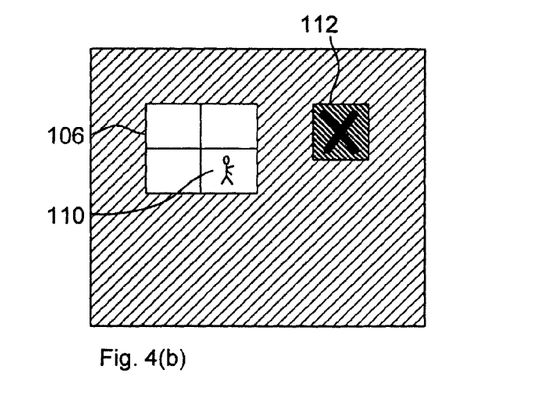
FIG. 4(b) illustrates a low dynamic range output image where a global consistency constrained is satisfied to a high degree.

FIGS. 4(a) and 4(b) illustrate low dynamic range output images where the global consistency constrained is satisfied to a low degree and a high degree respectively. In both FIGS. 4(a) and 4(b) the local contrast constraint is satisfied to a high degree. In one example, the local contrast constraint is satisfied when two points with a noticeable contrast in the high dynamic range input image have at least a noticeable contrast in the output image. As can be seen in FIGS. 4(a) and 4(b), the cross on the object 112 as well as the picture 110 on window 106 are visible, which is already an enhancement over the images in FIGS. 1(b) and 1(c). This means that the local contrast is preserved and this local contrast is described in further detail below.

However, the object 112 in the scene 102 is darker than the window 106 but has the same brightness in the output image of FIG. 4(a). This means that a relationship defined as the window 106 being brighter than the object 112 in the high dynamic range image is not preserved in the low dynamic range image. As a result, the global consistency constraint between the points of the window 106 and the points of the object 112 is satisfied to a low degree. In a photograph this leads to an unnatural appearance to a viewer.

In a different example, the high dynamic range image is a depth map where a distance of objects from the user is represented by decreasing brightness values. The depth map is created by computing stereo disparities between two space-separated parallel cameras. It is necessary that different objects are distinguishable in a low, dynamic range version of the depth map without changing the spatial relationship between the objects. In other words, if a first object, is closer to a user and hence brighter in the high dynamic range than a second object that is further away, the relative brightness should not change in the low dynamic range image since otherwise the second object would appear closer.

In yet another example, the high dynamic range image is an importance map. The perception of these "important regions" must be preserved at different dynamic ranges. For instance, objects must be visually different from their background, given a ground-plane segmentation. Therefore, it is ideal to augment these importance maps to the original image to highlight the importance contrasts while keeping other regions unchanged.

FIG. 4(b) illustrates a low dynamic range image where both constraints are satisfied to a high degree and in particular the global consistency constraint is satisfied to a higher degree than in FIG. 4(a). While the local contrast is still preserved, the object 112 is now darker than the window 106 resulting in a natural appearance of the image to a viewer.

As mentioned above, local contrast constraint is based on a local contrast in a perception space. This is now explained in more detail. In one example, the local contrast constrained is based on a just noticeable difference (JND) and in particular on the contrast in the JND space. An increase in 1 in the JND space corresponds to the smallest detectable change in the visual space, that is, it is just noticeable.

FIG. 5 illustrates a method 500 for determining low dynamic range image data from high dynamic range image data. The method 500 commences by receiving 502 high dynamic range image data from the camera 114 or accessing it from typically local memory. The method 500 then proceeds to determine 504 the low dynamic range image data based on the high dynamic range image data. The method 500 achieves step 504 by optimising 506 a degree to which the low dynamic range image data satisfies a local contrast constraint and a global consistency constraint.

The local contrast constraint is based on 508 in a local contrast in a perception space. Denote $-I_i$, as the input intensity for pixel i, and $-p_i$ as its value in the perceived JND space. The relation between intensity $I_i$ and perception $p_i$, also referred to as perception value of a point of the image data, can be mathematically characterized as $dp_i=k \times dI_i/I_i$, where d is the derivative operator and k is a constant scaling factor, such as 0.1.
Integration Yields $$p_i = k \ln(I_j) + C \qquad (1)$$

Where C is an arbitrary constant that varies from one image point to another and represents the sensitivity threshold for the input signal. A difference or contrast below this threshold is not perceived at all. However, C has not been explicitly addressed satisfactorily. Some methods for tone mapping (TM) assume C=0 for all pixels or use different predefined curves for different regions (local methods) without C. Problems arise in both cases: the former is a two stage problem that needs additional local contrast enhancement, and the latter framework may lead to large global inconsistency.

As a result, the method needs to handle C explicitly: 1) Ignoring C is essentially the origin of local adaptation problems; 2) Estimating C empowers a simple logarithm function to handle versatile cases in many natural images.

In one example, the solution is to "cancel out" C. Because of Local Adaptation (LA) of the retina, it can be assumed that all pixels in any local patch have a unique sensitivity level. Therefore, we can remove the factor of C by computing the gradient in a perception space, such as the JND space. In one example, the patch as a square region of 9 by 9 pixels.

Given an image patch with n pixels, a difference in perception, that is a contrast, can be calculated using (1) between the perception pi of pixel i and the average perception of the rest of the patch. This contrast is a local contrast since only pixels of the patch are considered. A patch is simply a sub-set of pixels of the high dynamic range image data. The patch is typically formed from pixels that neighbor pixel i with i forming the centre of a patch. The definition of a patch can be predetermined, for example of a circle with a radius of x pixels and i as the centre. Alternatively, the patch may be determined dynamically based on the contrast of pixels that neighbor pixel i. For example immediate neighbours of pixel i, and in turn their neighbours and so on may be included in the patch if the contrast is higher than a threshold or the pixel is more than a distance from pixel i. In this way the shape and size of the patch is dynamically determined based on the actual values of the pixels in the image data.

For determining this contrast the intensities are transformed into a perception space according to (1) resulting in a local contrast in a perception space.

It is a constraint to the solution that a perceivable local contrast in the high dynamic range image data is also a perceivable local contrast in the low dynamic range image data. As a result, this constraint is formulated as an equality between the local contrast in the perception space of the intensities of the high dynamic range image data and the local contrast in the perception space of the low dynamic range image data.

If we assume C is constant for all pixels I, of the patch, we have for the local contrast constraint in the perception space:

$$p_c - \frac{1}{n-1} \sum_{j \neq c} p_j = \ln(I_c) - \frac{1}{n-1} \sum_{j \neq c} \ln(I_j), \qquad (2)$$

where j is a pixel in patch I and c is the center pixel.

Eq. (2) can be easily extended to any linear contrast filter Proc( ) with Proc(1)=0, where 1 is a patch whose pixel values are all 1.

$$\text{Proc}(P) = \text{Proc}(\ln(I)), \qquad (3)$$

where P is the output patch in the JND space, and k=1 for simplification.

Eq. (3) gives us a local contrast constraint for each image patch in the perception space, that is the JND space.

The previous derivation does not limit JND function to be ln( ). This is because many such curves are originally defined in the differential space. The issue of C always appears when we integrate a differential equation.

For instance, another example for a JND definition of the perception space is based on the sigmoid function:

$$p_i = \frac{1}{1+\exp(-\mathcal{I}_i)} + C, \quad (4)$$

for i=1 . . . n in an image patch. Therefore, this can be seamlessly plugged into our model (Eq. (3)). In the following description the earlier example of equation (1) is used.

Given all patches in an image, Eq. (3) is a convolution process. However, applying the off-the-shelf deconvolution algorithms (e.g., Wiener filtering) directly may not yield meaningful results. A primary reason is that global consistency constraints are not taken into account.

The global consistency constraint in method 500 is based 510 on a relationship between points in the high dynamic range image data. The aim is to preserve overall patterns in pixel values in the image.

In one example, global consistency is expressed by pairwise comparison. Given any two pixels $I_i$ and with their mapping $P_i$ and $P_j$ in the JND space, we have $$p_i - p_j \geq 0 \Leftrightarrow I_i - I_j \geq 0, \quad (5)$$

To reduce the number of such constraints, we sort all image pixels in ascending order, and only compare adjacent pixels in the sorted array. It is noted that this is a weak constraint. In minimization, some pixels may still flip their order. As a result, the method optimises a degree to which the global consistency constraint is satisfied. The method is a deconvolution process with global consistency constraints.

Two terms arise in our formulation: 1) cJND for the local contrast constraint and 2) pairwise difference for the global consistency constraint. We discuss these two constraints in succession. In the derivation, we only consider one channel (e.g., R, G, B, or luminance). In one example, the method reduces the dynamic range of the combined intensity and then scale the RGB channels accordingly. In a different example, the method handles the RGB channels separately.

We can express Eq. (2) or Eq. (3) for each pixel in a matrix-vector farm. In the following discussion, we denote $\bar{x}$ as the solution in the JND space, $\bar{y}$ is the input image, and G is the contrast filter in the matrix form. In an example of a patch of 3 by 3 pixels the matrix G is according to Eq. (2):

$$\begin{bmatrix} -\frac{1}{8} & -\frac{1}{8} & -\frac{1}{8} \\ -\frac{1}{8} & 1 & -\frac{1}{8} \\ -\frac{1}{8} & -\frac{1}{8} & -\frac{1}{8} \end{bmatrix}$$

The variables are column vectors by default, and ln( ) denotes processing each element in the input. The linear equation for the local contrast constraint, that is local contrast preservation is $$G\bar{x} = kG\ln(\bar{y}) \quad (6)$$

Sort the image to an array and denote D as the difference operator of adjacent pixels in the sorted array, the global consistency constraint can be explicitly expressed as:

$$D\bar{x} + v = 0. \quad (7)$$

where v is nonnegative.

The structure of D may be explained using a simple example of five pixels $x_1$ to $x_5$. The ordered array of the pixels in this example is given as $[x_1, x_5, x_4, x_2, x_3]$. From the ordered array it is clear that, in this example, $x_1$ is the closest point in intensity to $x_5$, $x_5$ is the closest point in intensity to $x_4$ and so on. Then the convolution or filtering of equation (7) can be written as $$\begin{bmatrix} -1 & 0 & 0 & 0 & 1 \\ 0 & 0 & 0 & 1 & -1 \\ 0 & 1 & 0 & -1 & 0 \\ 0 & -1 & 1 & 0 & 0 \end{bmatrix} \begin{bmatrix} x_1 \\ x_2 \\ x_3 \\ x_4 \\ x_5 \end{bmatrix} + \begin{bmatrix} v_1 \\ v_2 \\ v_3 \\ v_4 \end{bmatrix} = 0$$

Combining Eq. (6) and (7) as two parts of a linear system, the resulting linear system for optimization is $$\begin{bmatrix} \lambda k \ln(G\bar{y}) \\ 0 \end{bmatrix} = \begin{bmatrix} \lambda G & 0 \\ D & I_D \end{bmatrix} \times \begin{bmatrix} \bar{x} \\ v \end{bmatrix} \quad (8)$$

where $\lambda$ is the regularization or trade-off term between contrast and global consistency, and $I_D$ are identity matrices.

This formulation intrinsically has only 1 parameter $\lambda$. Small $\lambda$, such as less than 0.2, may not "compress" the original dynamic range to reveal the details, while large $\lambda$, such as more than 2, compresses the dynamic range to visible range but global consistency may not be preserved. In one example, $\lambda$ is 0.5.

To see this, Eq. (8) can be revised as $$\begin{bmatrix} \lambda \ln(G\bar{y}) \\ 0 \end{bmatrix} = \begin{bmatrix} \lambda G & 0 \\ D & I_D \end{bmatrix} \times \begin{bmatrix} \frac{\bar{x}}{k} \\ \frac{v}{k} \end{bmatrix} \triangleq \begin{bmatrix} \lambda G & 0 \\ D & I_D \end{bmatrix} \times \begin{bmatrix} x' \\ v' \end{bmatrix} \quad (9)$$

This means the JND coefficient k is a scale factor only in the output JND space. These facilitate our calculation in two ways:
1. We explicitly set k=1, and normalize the solution to simplify the process.
2. Our formulation has only 1 regularization parameter $\lambda$ to control the trade-off between local contrast and global consistency.

To conclude our formulation. Eq. (8) can be expressed as $$y = Ax. \quad (10)$$

subject to $0 \leq x \leq 255$ for the luminance space.

In one example, the low dynamic range is still high enough such that a difference between two pixels that is just noticeable to the human eye relates to a difference in pixel value of at least one step of the low dynamic range. In this example, a low dynamic range of 255 values or steps, that is 8 bits, is found to meet this requirement. As a result, when implementing the method, the variables are implemented as float type and the output values x are bound to 255. After the optimisation of Eq. (10) finishes, the method simply takes the integer part or a rounded value of x as the pixel value.

In a different example, the display is a retinal prosthesis and the the low dynamic range of the display is smaller, such as 8 values or steps, that is 3 bits. In this example, an additional constraint needs to be included to prevent that two pixels with a noticeable local contrast are mapped to the same value due to the quantisation.

In this example, equation (2) changes slightly. Denote I as a gray scale depth representation patch (e.g., any 5×5 region) that has n pixels and c is its center pixel index. The center pixel is "just noticeable" if and only if:

$$\frac{\left|I_c - \frac{1}{n-1}\sum_{j \neq c} I_i\right|}{\frac{1}{n-1}\sum_{j \neq c} I_j} \geq \delta, \quad (11)$$

where j=1 . . . n, and I is the pixel value for the $j^{th}$ pixel. $\delta$ is the JND value, which is normally small (e.g., 0.1).

As mentioned earlier Eq. (11) can be easily extended to any linear contrast filter. For simplicity, we will stick to the simpler formulation.

The contrast of I can still be perceived at k levels of brightness if:

$$I_c - \frac{1}{n-1}\sum_{j \neq c} I_j \geq \frac{1}{k}, \quad (12)$$

Thus, we state that this patch I is "just noticeable" under a quantization $$\frac{1}{k}$$

it and only if it satisfies Eq. (11) and (12).

In one example, the method is performed for visualizing ground-plane segmentation using the JND principle. Define X as the solution of visualizing an image P at k levels of dynamic range. Typically, there are three sets of variables of X: 1) pixels of plane regions 2) boundary pixels of plane regions, and 3) pixels inside ground regions. The solution of visualization must keep the variables in Set 1 unchanged and the ones in Set 2 with a local difference from the neighbouring ones in Set 1 that is at least "just noticeable". This means that it is the difference between the values that is just noticeable, and that this difference is free to be more than just noticeable, but must be at least just noticeable. Further, the ordering of Set 3 must be preserved as much as possible. Therefore, we formulate our visualization method as follows.

For variables x of Set 1, we take a $\sqrt{n} \times \sqrt{n}$; patch where i is its center pixel index. According to the proposed JND principle, we have:

$$\begin{cases} x_i - \frac{1+\delta}{n-1}\sum_{j \neq i} x_j - u_i^1 = 0 \\ x_i - \frac{1}{n-1}\sum_{j \neq i} x_j - u_i^2 = \frac{1}{k} \end{cases}, \text{ if } p_i \geq \frac{1}{n-1}\sum_{j \neq i} p_j \text{ or} \quad (13)$$

$$\begin{cases} -x_i + \frac{1-\delta}{n-1}\sum_{j \neq c} x_j - u_i^1 = 0 \\ -x_i + \frac{1}{n-1}\sum_{j \neq i} x_j - u_i^2 = \frac{1}{k} \end{cases}, \quad (14)$$

In both cases, $u_b^1$ and $u_b^2$ are nonnegative. This can be written as a linear equation system:

$$A_1 x - u = y_1, \quad (15)$$

The constraints in the pixels of set 3 is the ordering constraints between pairs of variables $(x_i, x_j)$.

$$x_i - x_j - v_{ij} = 0 \Leftrightarrow p_i > p_j, \quad (16)$$

where $v_{ij}$ is a nonnegative variable.

Further, if the pixels have the same values in the depth map, they must have the same value in the visualization space.

$$x_i = x_j \Leftrightarrow p_i = p_j, \quad (17)$$

This gives us a second linear system.

$$A_2 x - v = 0, \quad (18)$$

For the pixels in the plane region, we set $$x_i = p_i, \quad (19)$$

This gives us the third linear system $$A_3 x = y_3, \quad (20)$$

Therefore, we can rewrite the whole visualization problem as a linear programming problem $$\begin{bmatrix} y_1 \\ y_2 \\ y_3 \end{bmatrix} = \begin{bmatrix} A_1 & -I_1 & 0 \\ A_2 & 0 & -I_2 \\ A_3 & 0 & 0 \end{bmatrix} \times \begin{bmatrix} x \\ u \\ v \end{bmatrix} \quad (21)$$

subject to x,u,v≥0, where $I_1$ and $I_2$ are two identity matrices. Once we have the solution x, we can re-normalize it to 0-1 and render the solution in phosphene maps by downsampling and reducing dynamic range.

In one example, the output image is converted by a process commonly referred to as phosphenisation into a format that is suitable for stimulation by a vision enhancement apparatus, such as a low resolution retinal prosthesis which is implanted into an eye of a user.

In one example, the method uses the simulated phosphene vision system described in [LIE11] where phosphenes are built as discrete Gaussian kernels using impulse sampling of the segmented region at the phosphene location, without prior filtering. Other common methods for rendering phosphenes are to filter the image prior to sampling [CHE05] or after [DOW06], or apply a mean or Gaussian filter over an area centred at the phosphene location [CHE09]. The method 500 applies phosphene rendering to both the original intensity image (for comparison) and the segmented region, that is the shape of an object in the scene determined by processor 320.

The simulated phosphene display consists of a 35×30 rectangular grid scaled to image size. Each phosphene has a circular Gaussian profile whose centre value and standard deviation is modulated by brightness at that point [VUR06]. In addition, phosphenes sum their values when they overlap. In one example, phosphene rendering is performed at 8 bits of dynamic range per phosphene, which is an idealised representation. In a different example, it is assumed that maximum neuronal discrimination of electrical stimulation is closer to a 3 bit rendering.

In another example, instead of simulation of phosphenes, the processor 320 determines the low resolution image data to create real phosphenes which is the name given to the perceptual artefact caused by electrical stimulation on an electrically stimulating visual prosthetic such as a retinal implant. In yet another example, there are different numbers of bits at each phosphene and this may change over time.

It is again noted that the local contrast constraint is based on a local contrast in a perception space and is expressed by Eq. (6). The method determines the low dynamic range image data based on the high dynamic range image data by optimising a degree to which the low dynamic range image data satisfies the local contrast constraint in an image patch based on the relevant pixel. That is the method determines low dynamic range image data while aiming to increase the degree to which the equal sign in Eq. (6) is satisfied. The result is that contrast in edges of object being defined by a local set of pixels in the high dynamic range image is maintained in the low dynamic range image data. In this way contrast edges of objects such as an obstacle, outline of text or a sign is preserved.

On the other hand, the global consistency constraint is based on a relationship between points in the high dynamic range image data as expressed by Eq. (7). The method determines the low dynamic range image data based on the high dynamic range image data by optimising a degree to which the low dynamic range image data satisfies the global consistency constraint. That is the method determines low dynamic range image data while aiming to satisfy the requirement that v in Eq. (7) is nonnegative given the matrix D that represents the relationship between points in the high dynamic range image data.

These two constraints are written as one linear system of Eq. (10). The local contrast constraint is represented by the equality sign and therefore, minimising an error function that is based on the difference between the right hand side and the left hand side of Eq. (10) will optimise the degree to which the low dynamic range image data satisfies the local contrast constraint. Further, the global consistency constraint is represented by a boundary on x. Therefore, a solver needs to minimise the error function while also aiming to stay within the boundary. As a result, the method optimises a degree to which the two constraints are satisfied.

In one example, the optimisation is an iterative gradient based method that moves in each step of the iteration from a starting solution for x to a new solution based on the gradient of the cost function and a step length. The new solution represents low dynamic range image data that satisfies the local contrast constraint to a higher degree than the previous solution. After moving to the new solution, the method determines whether the new solution satisfies the global consistency constraint. If the global consistency constraint is not satisfied or satisfied only to a lower degree, the method returns to the previous solution and moves in a different direction.

In one example, the degree to which the low dynamic range satisfies the global consistency constraint is measured by the number of pixels that satisfy the global consistency constraint or by the cumulative distance from the constraint of all pixels that do not satisfy the constraint. The distance to the constraint may be determined as the value of v for those pixels having a negative value for v.

Eq. (10) has a large number of variables. For instance, a 1000×1000 image is equivalent to 1 million variables. Improper selection of an optimization method can easily slow down the deconvolution. L-BGGS and Conjugate Gradient are two examples [STES7].

In one example, the method uses Broyden-Fletcher-Goldfarb-Shanno method (BFGS) in a bounded version L-BFGS ("L-BFGS-B"), where the bounded version is required to optimise the degree to which the global consistency constraint is optimised. In a different example the Nonnegative Conjugate Gradient (NCG) method is used, where the nonnegative version is required to optimise the degree to which the global consistency constraint is optimised. In one example L-BFGS uses a Fortran routine [ZHU97], while Conjugate Gradient is purely in Matlab.

Since NCG is simple and has the potential to speed up, we briefly introduce the NCG method for tone mapping (TM) in the Appendix. NCG has similar advantages as other Conjugate Direction method where only Ax and A'y are required (A' is the transpose of A in Eq. 10), with a small overhead to satisfy the boundary condition. The key idea of NCG is to go backward if any variable is out of bounds, and re-start the algorithm if necessary. We summarize the algorithm for readers' convenience in Sec. 7. Please refer to [HES80] for details.

What follows is a discussion of the constant C in Eq. (1). As noted before, C is related to the sensitivity threshold of the local adaptation. In one example a hypothesis is $$C = a_1 \frac{1}{n-1} \sum_i \ln(I_i) + a_2. \tag{22}$$

for an image patch I, where $a_1$ and $a_2$ are constant for the whole image. Let B=Proc(I). Plugging Eq. (22) into the Eq. (2), we have a general form $$p_i = \alpha \ln(I_i) + \beta(\ln B_i) + \gamma \tag{23}$$

Therefore, we essentially fit a plane $[\alpha,\beta,-1,\gamma]$ to the points $[I_i,B_i,p_i,1]$ in A 3d homogenous space. In our experiment, Eq. (23) works well in fitting the TM (tone mapping) function. Usually only 2% fitting function error is produced in our dataset.

This parameterization further allows us to speed up the TM optimization if computational time is a constraint. Assuming the same image at different resolutions has similar TM curves. In one example, the method learns a sensitivity threshold in form of a TM plane using the image in a reduced spatial resolution, and then applies this plane to a higher resolution. In one example, image data of a reduced spatial resolution is determined by selecting every second pixel of the high resolution image data. As a result, the reduced spatial resolution is half the high resolution. In other examples, other methods for resolution reduction are employed.

In one example the method is implemented as outlined in the Appendix in Matlab. Both Ax and A'y can be implemented using convolution. This greatly reduced the computational cost further. The iteration number was set to 3000 for all images. A 1024×768 images takes 10 minutes on a Core Duo 2.8 GHz on full image scale using the unoptimized Matlab code.

In one example the method chooses input channels based on a process luminance map and scaling the color space accordingly. In a different example the method processes each color channel. Empirically we have better results using color channels separately when the dynamic range is small (e.g., $\approx 10^3$). Gamma correction is used to properly visualize results in JND space (Eq. (10)) to a display device.

In another example, the method is applied to frames of video data. Since the method aims to preserve the local contrast and the global consistency, the method generates consistent visualisation across the frames of the video data. In one example, the frames of video data are depth maps as explained earlier and the low dynamic range output image is displayed to a vision impaired user. The reason for displaying depth maps to the user is to enable the user to move around without external aids, such as a white cane or a guide dog. The aim of using the proposed method to determine a low resolution version of the depth map is that obstacles in the video data can be perceived because critical contrast is preserved. In one example the maps, such as depth maps or regular images on a screen, or on a bionic eye representing intensity, are tuned to the low dynamic range perception of a vision impaired user.

In another example, the output image is further adjusted to suit a particular vision impaired user by a user specific map in the vision enhancement apparatus. This user specific map may change over time due to factors such as polarisation of neurons. In one example, the method determines the user specific map at run time, and adjusts the output image to the particular visual performance of the user with respect to their visual field dynamic ranges.

In yet another example, the method adapts to the perception of the user on a frame by frame basis, where the current dynamic range for each visual field is measured or estimated based on the user specific map. This strategy will also make it possible to measure or estimate the effectiveness of stimulation device based on previous stimulations.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

APPENDIX

Hestenes [HES80] only provided the NCG with lower bound case. We modified it to handle both lower and upper bounds. Our JND space is unbounded, thus the upper bound is not necessary in theory. However, our experience shows that providing a upper bound improves the performance in certain cases.

Nonnegative Conjugate Gradient
Input: y, (lb,ub), A, A', $x^{(0)}=0$, $s^{(0)}=y-Ax^{(0)}$ and $r^{(0)}=A's^{(0)}$
Step 1, k=1
1. Let $I_l$ be the set that $x_i^{(l)}=$lb and $r_i^{(l)} \leq 0$;
2. Let $I_u$ be the set that $x_i^{(l)}=$ub and $r_i^{(l)} \geq 0$;
3. I={$I_l$, $I_u$}. If $|r_i^0| \leq \in$, $\forall i \notin I$, program terminates.
Step 2: $p^{(k)}=r^{(k)}$, set $p_i^{(k)}=0$, $\forall i \in I$.
1. $q^{(k)}=Ap^{(k)}, c^{(k)}=q^{(k)'}s^{(k)}, d^{(k)}=|q^{(k)}|^2$, $$a^{(k)} = \frac{c^{(k)}}{d^{(k)}};$$

2. $x^{(k+l)}=x^{(k)}+a^{(k)}p^{(k)}, s^{(k+l)}=s^{(k)}-a^{(k)}q^{(k)}, r^{(k+l)}=A's^{(k+l)}$;
3. if $x^{(k+l)} \notin S$, go to step 3
4. if $|r_i^{(k+l)}| \leq \in$, $\forall i \notin I$, set $x^{(0)}=x^{(k+l)}, s^{(0)}=y-Ax^{(0)}$, and goto Step 1.
5. $r=r_i^{(k+l)}$, set r=0, $\forall i \in I$, $p^{(k+l)}=r+b^{(k)}p^{(k)}$, $$b = \frac{|r|^2}{c^{(k)}}$$

Step 3:
1. let i be the indices that $x_i^{(k+l)} >$lb or $x_i^{(k+l)} <$ub, $$let \ a^{(k)} = \min\left(-\frac{x_i^{(k+1)}}{p_i^{(k+1)}}\right)$$

2. $x^{(l)}=x^{(k)}+a^{(k)}p^{(k)}, s^{(l)}=y-Ax, r^{(l)})=A's^{(l)}$;
3. Redefine I to be all set that $x_i^{(l)=lb \ and} r_i^{(l)} \geq 0$, or $x_i^{(l)}=$ub and $r_i^{(l)} \geq 0$;
4. if $|r_i^{(l)}| < \in|$, $\forall i \in I$, goto Step 1; else goto Step 2.

REFERENCES

[HES80] Hestenes, M.: Conjugate direction methods in optimization. Applications of mathematics. Springer-Verlag (1980).
[STE57] Stevens, S. S.: On the psychophysical law. Psychology Revue 64 (1957) 153-181.
[ZHU97] Zhu, C., Byrd, R. H., Lu, P., Nocedal, J.: Algorithm 778: L-bfgs-b: Fortran subroutines for large-scale bound-constrained optimization. ACM Trans. Math. Softw. 23 (1997) 550-560.
[CHE05] S. C. Chen, L. E. Hallum, N. H. Lovell, and G. J. Suaning. Visual acuity measurement of prosthetic vision: a virtual-reality simulation study. J. Neural Eng., 2:S135S145, 2005.
[CHE09] S. C. Chen, G. J. Suaning, J: W. Morley, and N. H. Lovell. Simulating prosthetic vision: I. Visual models of phosphenes. Vision Research, 2009.
[DOW06] J. Dowling, W. Boles, and A. Maeder. Simulated artificial human vision: The effects of spatial resolution and frame rate on mobility. In Active Media Technology, number 138, pages 138143, 2006.
[LIE11] P. Lieby, N. Barnes, C. McCarthy, N. Liu, H. Dennett, J. G. Walker, V. Botea, and A. F. Scott. Substituting depth for intensity and real-time phosphene rendering: Visual navigation under low vision conditions. EMBC, 2011.
[VUR06] M. Vurro, G. Baselli, F. Orabona, and G. Sandini. Simulation and assessment of bioinspired visual processing system for epi-retinal prostheses. In Engineering in Medicine and Biology Society, 2006. EMBS 06. 28th Annual International Conference of the IEEE, 2006.

The invention claimed is:

1. A computer implemented method for determining low dynamic range image data from high dynamic range image data, the method comprising:
receiving or accessing the high dynamic range image data; and
determining the low dynamic range image data based on the high dynamic range image data by optimising a degree to which the low dynamic range image data satisfies a local contrast constraint and a global consistency constraint to a high degree, wherein the local contrast constraint is based on a local contrast in a perception space, the global consistency constraint is based on a relationship between points in the high dynamic range image data, wherein the degree to which the low dynamic range image data satisfies a local contrast constraint is based on an error function that represents a distance of a candidate solution from the local contrast constraint in a solution space.

2. The computer implemented method of claim 1, wherein optimising the degree to which the low dynamic range image data satisfies the local contrast constraint and the global consistency constraint comprises optimising a linear system bounded by the global consistency constraint.

3. The computer implemented method of claim 1, wherein the perception space is based on a just noticeable difference.

4. The computer implemented method of claim 1, wherein the perception space is based on a transformation defined by $p = k \ln(I_i) + C$ or $$p = \frac{1}{1 + \exp(-I_i)} + C$$

from an intensity value $I_i$ in an intensity space into a perception value $p_i$ in the perception space, where C is an arbitrary constant that varies in the high dynamic range image data and k is a scaling factor.

5. The computer implemented method of claim 1, wherein the local contrast in the perception space is based on perception values of image points of a patch comprised of a sub-set of points of the high dynamic range image data.

6. The computer implemented method of claim 5, wherein the local contrast of one point of the patch is based on a difference between the perception value of that point and an average perception value of the other points of the patch.

7. The computer implemented method of claim 1, wherein optimising the degree to which the low dynamic range image data satisfies the local contrast constraint and the global consistency constraint is based on a predetermined trade-off parameter that prioritizes one of the local contrast constraint and the global consistency constraint.

8. The computer implemented method of claim 1, wherein optimising the degree to which the low dynamic range image data satisfies the local contrast constraint and the global consistency constraint comprises simultaneously optimising the degree to which the low dynamic range image data satisfies the local contrast constraint and the global consistency constraint.

9. The computer implemented method of claim 1, wherein optimising the linear system is based on one or more of:
bounded Broyden-Fletcher-Goldfarb-Shanno method, and
non-negative conjugate gradient method.

10. The computer implemented method of claim 1, further comprising displaying the low dynamic range image data on a vision enhancement apparatus.

11. The computer implemented method of claim 1, wherein the high dynamic range image data is a depth map of a scene.

12. A non-transitory computer readable medium with an executable program stored thereon that when executed causes the computer to perform the method of claim 1.

13. A computer implemented method for determining the low dynamic range image data based on the high dynamic range image data by optimising a degree to which the low dynamic range image data satisfies a local contrast constraint and a global consistency constraint, wherein the local contrast constraint is based on a local contrast in a perception space, the global consistency constraint is based on a relationship between points in the high dynamic range image data, wherein the degree to which the low dynamic range satisfies the global consistency constraint is based on the degree to which an ordering of points of the high dynamic range image data by image value is preserved in the low dynamic range image data.

14. The computer implemented method of claim 13, further comprising determining a difference operator that defines a difference between a first point and a second point, the second point being the closest in intensity to the first point, wherein the degree to which the ordering of points of either the high dynamic range image data is preserved is based on the difference operator.

15. A computer implemented method for determining high spatial resolution, low dynamic range image data from high spatial resolution, high dynamic range image data, the method comprising:
receiving the high spatial resolution, high dynamic range image data;
determining low spatial resolution, high dynamic range image data based on the high spatial resolution, high dynamic range image data;
determining low spatial resolution, low dynamic range image data from the low spatial resolution, high dynamic range image data by optimising a degree to which the low spatial resolution, low dynamic range image data satisfies a local contrast constraint and a global consistency constraint to a high degree, wherein the local contrast constraint is based on a local contrast in perception space, the global consistency constraint is based on a relationship between points in the low spatial resolution, high dynamic range image data;
determining a sensitivity threshold for each of multiple patches based on the determined low spatial resolution, low dynamic range image data; and
determining for each of the multiple patches the high spatial resolution, low dynamic range image data based on the high spatial resolution, high dynamic range image data and the sensitivity threshold of that patch.

16. A computer system for determining low dynamic range image data from high dynamic range image data, the system comprising:
an input port to receive or access the high dynamic range image data; and
a processor to determine the low dynamic range image data based on the high dynamic range image data by optimising a degree to which the low dynamic range image data satisfies a local contrast constraint and a global consistency constraint, wherein the local contrast constraint is based on a local contrast in a perception space, the global consistency constraint is based on a relationship between points in the high dynamic range image data, wherein the degree to which the low dynamic range image data satisfies a local contrast constraint is based on an error function that represents a distance of a candidate solution from the local contrast constraint in a solution space.

17. A vision enhancement apparatus for enhancing vision for a vision impaired user of high dynamic range image data, the apparatus comprising:

an input port to receive or access the high dynamic range image data;

a processor to determine low dynamic range image data based on the high dynamic range image data by optimising a degree to which the low dynamic range image data satisfies a local contrast constraint and a global consistency constraint to a higher degree, wherein the local contrast constraint is based on a local contrast in a perception space, the global consistency constraint is based on a relationship between points in the high dynamic range image data; and a display to display or to cause the display of the low dynamic range image data to the vision impaired user, wherein the degree to which the low dynamic range image data satisfies a local contrast constraint is based on an error function that represents a distance of a candidate solution from the local contrast constraint in a solution space.

* * * * *

UNITED STATES PATENT AND TRADEMARK OFFICE
CERTIFICATE OF CORRECTION

PATENT NO.        : 9,501,816 B2
APPLICATION NO.   : 14/399493
DATED             : November 22, 2016
INVENTOR(S)       : Yi Li et al.

It is certified that error appears in the above-identified patent and that said Letters Patent is hereby corrected as shown below:

In the Specification
Column 3, Lines 8-16 Should Read As Follows:
defined by $p_i = k\ln(I_i)+C$ or $$p_i = \frac{1}{1+\exp(-I_i)} + C$$

from an intensity value $I_i$ in an intensity space into a
perception value $p_i$ in the perception space, where C is an Column 7, Lines 49-59 Should Read As Follows:
The local constraint is based 508 on a local
contrast in a perception space. Denote I, as the input
intensity for pixel $i$, and $p_i$ as its value in the perceived JND
space. The relation between intensity I and perception $p_i$,
also referred to as perception value of a point of the image
data, can be mathematically characterized as $dp_i = k \times dI/I_i$,
where $d$ is the derivative operator and $k$ is a constant scaling
factor, such as 0.1.
Integration Yields
$p_i = k\ln(I)+C$ Column 8, Line 15 Should Read As Follows:
Given an image patch I with $n$ pixels, a difference in Column 10, Line 53 Should Read As Follows:
subject to $0 \leq x \leq 255$ for the luminance space.

Signed and Sealed this
Second Day of May, 2017

Michelle K. Lee
*Director of the United States Patent and Trademark Office*

CERTIFICATE OF CORRECTION (continued)
U.S. Pat. No. 9,501,816 B2

Column 16, Lines 34-35 Should Read As Follows:

3. Redefine $I$ to be all set that $x_i^{(1)} = lb$ and $r_i^{(1)} \leq 0$, or $x_i^{(1)} = ub$ and $r_i^{(1)} \geq 0$;